(12) United States Patent
Austin et al.

(10) Patent No.: US 11,748,521 B2
(45) Date of Patent: Sep. 5, 2023

(54) PRIVACY-ENHANCED COMPUTATION VIA SEQUESTERED ENCRYPTION

(71) Applicant: Agita Labs, Inc., Ann Arbor, MI (US)

(72) Inventors: Todd M Austin, Ann Arbor, MI (US);
Valeria Bertacco, Ann Arbor, MI (US);
Alexander Kisil, Ann Arbor, MI (US)

(73) Assignee: Agita Labs, Inc., Ann Arbor, MI (US)

( * ) Notice: Subject to any disclaimer, the term of this patent is extended or adjusted under 35 U.S.C. 154(b) by 41 days.

(21) Appl. No.: 17/553,884

(22) Filed: Dec. 17, 2021

(65) Prior Publication Data

US 2022/0198067 A1 Jun. 23, 2022

Related U.S. Application Data

(60) Provisional application No. 63/221,594, filed on Jul. 14, 2021, provisional application No. 63/127,183, filed on Dec. 18, 2020.

(51) Int. Cl.
| | |
|---|---|
| *G06F 21/72* | (2013.01) |
| *G06F 21/62* | (2013.01) |
| *G06F 21/76* | (2013.01) |
| *H04L 9/06* | (2006.01) |
| *H04L 9/40* | (2022.01) |

(52) U.S. Cl.
CPC ............ *G06F 21/72* (2013.01); *G06F 21/62* (2013.01); *G06F 21/76* (2013.01); *H04L 9/0618* (2013.01); *H04L 9/0631* (2013.01); *H04L 9/0643* (2013.01); *H04L 63/0442* (2013.01); *H04L 2209/80* (2013.01)

(58) Field of Classification Search
CPC .......... G06F 21/72; G06F 21/62; G06F 21/76; G06F 21/60; G06F 21/602; H04L 9/06; H04L 9/0631; H04L 9/0637; H04L 9/30; H04L 9/3013; H04L 9/302; H04L 63/04; H04L 63/0442
See application file for complete search history.

(56) References Cited

U.S. PATENT DOCUMENTS

| | | | |
|---|---|---|---|
| 7,895,327 B2 * | 2/2011 | Klimov | .................. G06F 21/75 709/200 |
| 9,363,073 B2 * | 6/2016 | Teglia | ..................... H04L 9/002 |
| 10,776,522 B1 * | 9/2020 | McNeil | ................. H04L 9/3247 |

(Continued)

OTHER PUBLICATIONS

International Search Report and Written Opinion for PCT/US2021/063946 dated Mar. 30, 2022 (11 pages).

(Continued)

*Primary Examiner* — Shaqueal D Wade-Wright
(74) *Attorney, Agent, or Firm* — Bejin Bieneman PLC

(57) ABSTRACT

A system includes an electronic circuit. The electronic circuit includes a first set of electronic circuit elements electrically coupled to receive first secret data that was encrypted externally to the electronic circuit according to a data key and decrypt the first secret data based in part on parameters included in the data key. The electronic circuit further includes a second set of electronic circuit elements coupled to generate second secret data by executing one or more operations on the first secret data and a third set of electronic circuit elements coupled to encrypt the second secret data based in part on the parameters included in the data key, thereby providing encrypted second secret data for output.

56 Claims, 6 Drawing Sheets

(56) References Cited

U.S. PATENT DOCUMENTS

| | | | | |
|---|---|---|---|---|
| 2015/0339413 | A1* | 11/2015 | Priel | G06F 30/327 716/104 |
| 2015/0381659 | A1* | 12/2015 | Khazan | G06F 21/606 726/1 |
| 2018/0323967 | A1* | 11/2018 | Courtney | H04L 9/0643 |
| 2020/0396068 | A1* | 12/2020 | Sarno | H04L 9/0894 |
| 2021/0341989 | A1* | 11/2021 | Chen | G06N 3/063 |
| 2022/0035762 | A1* | 2/2022 | Zhang | G06F 13/4068 |
| 2022/0198068 | A1* | 6/2022 | Austin | H04L 63/0442 |

OTHER PUBLICATIONS

International Search Report and Written Opinion for PCT/US2021/063947 dated Apr. 4, 2022 (11 pages).

Gallagher, Mark et al.: "Morpheus", ASPLOS '19: Proceedings of the Twenty-Fourth International Conference on Architectural Support for Programming Languages and Operating Systems, ACM, 2 Penn Plaza, Suite 701, New York, NY 10121- (0701 USA; Apr. 4, 2019, pp. 469-484, XP058433473; DOI: 10.1145/3297858.3304037; ISBN: 978-1-4503-6240-5 section 4; figures 3-6 (_pages).

Biernacki, Lauren et al.: "Thwarting Control Plane Attacks with Displaced and Dilated Address Spaces", 2020 IEEE International Symposium on Hardware Oriented Security and Trust (Host), [online]; Dec. 7, 2020, pp. 57-68, XP055903441, DOI: 10.1109/HOST45689.2020.9300273; ISBN: 978-1-7281-7405-1; Retrieved from the Internet: URL: https://ieeexplore.ieee.org/stampPDF/getPDF.jsp?tp=&arnumber=9300273&ref=aHR0cHM6Ly9zY2hvbGFyLmdvb2dsZS5jb20v> [retrieved on Mar. 21, 2022] section III, figures 2-6 (12 pages).

Alfred Ng. 2018. How the Equifax hack happened, and what still needs to be done. CNET (Sep. 2018). https://www.cnet.com/news/equifaxs-hack-one-year-later-a-look-back-at-how-it-happened-and-whats-changed/; accessed Dec. 21, 2021.

Alex Schiffer. 2017. How a fish tank helped hack a casino. Washington Post (Jul. 2017). https://www.washingtonpost.com/news/innovations/wp/2017/07/21/how-a-fish-tank-helped-hack-a-casino; accessed Dec. 21, 2021.

IBM Corporation, Cost of a Data Breach Report 2020. (Jun. 2020). https://www.ibm.com/security/data-breach; accessed Dec. 21, 2021.

Spectre and Meltdown, (Jan. 2018), https://meltdownattack.com/; accessed Dec. 21, 2021.

Wikipedia.org, "Cryptographic hash function", https://en.wikipedia.org/wiki/Cryptographic_hash_function; accessed Dec. 21, 2021.

Wikipedia.org, "HMAC", https://en.wikipedia.org/wiki/HMAC; accessed Dec. 21, 2021.

Intel Corporation, "Intel Software Guard Extensions", https://software.intel.com/content/www/us/en/develop/topics/software-guard-extensions.html; accessed Dec. 21, 2021.

Emmett Witchel, Josh Cates, and Krste Asanović, "Mondrian memory protection", SIGOPS Oper. Syst. Rev. 36, 5, Dec. 2002.

R. C. Merkle, "Protocols for Public Key Cryptography", IEEE Symp. on Security and Privacy, 1980.

"2020 United States federal government data breach", https://en.wikipedia.org/wiki/2020_United_States_federal_government_data_breach#SolarWinds_exploit; accessed Dec. 21, 2021.

* cited by examiner

PRIVACY-ENHANCED COMPUTATION VIA SEQUESTERED ENCRYPTION

CROSS-REFERENCE TO RELATED APPLICATIONS

The present patent application claims priority to U.S. provisional patent application No. 63/127,183, filed on Dec. 18, 2020, and also to U.S. provisional patent application No. 63/221,594, filed on Jul. 14, 2021, the disclosures of each of which are incorporated herein by reference in their respective entireties.

BACKGROUND

With the growth of cloud computing and the Internet of Things (IoT), data security is becoming increasingly important. Cloud service providers have access to users' personal information. IoT devices are installed in our homes, our cars, and our workplaces. Software, ubiquitous in cloud and Internet based systems, can be hacked. Bad actors continue to develop new ways for infiltrating software, such that protections against known attacks leave room for improvement. Software hacks can be used to acquire data and/or defeat the operation of the hacked system. Further, our data can be vulnerable to side-channel attacks, wherein attackers measure differences in behavior of an algorithm in response to different input data.

DETAILED DESCRIPTION

Figure 1:
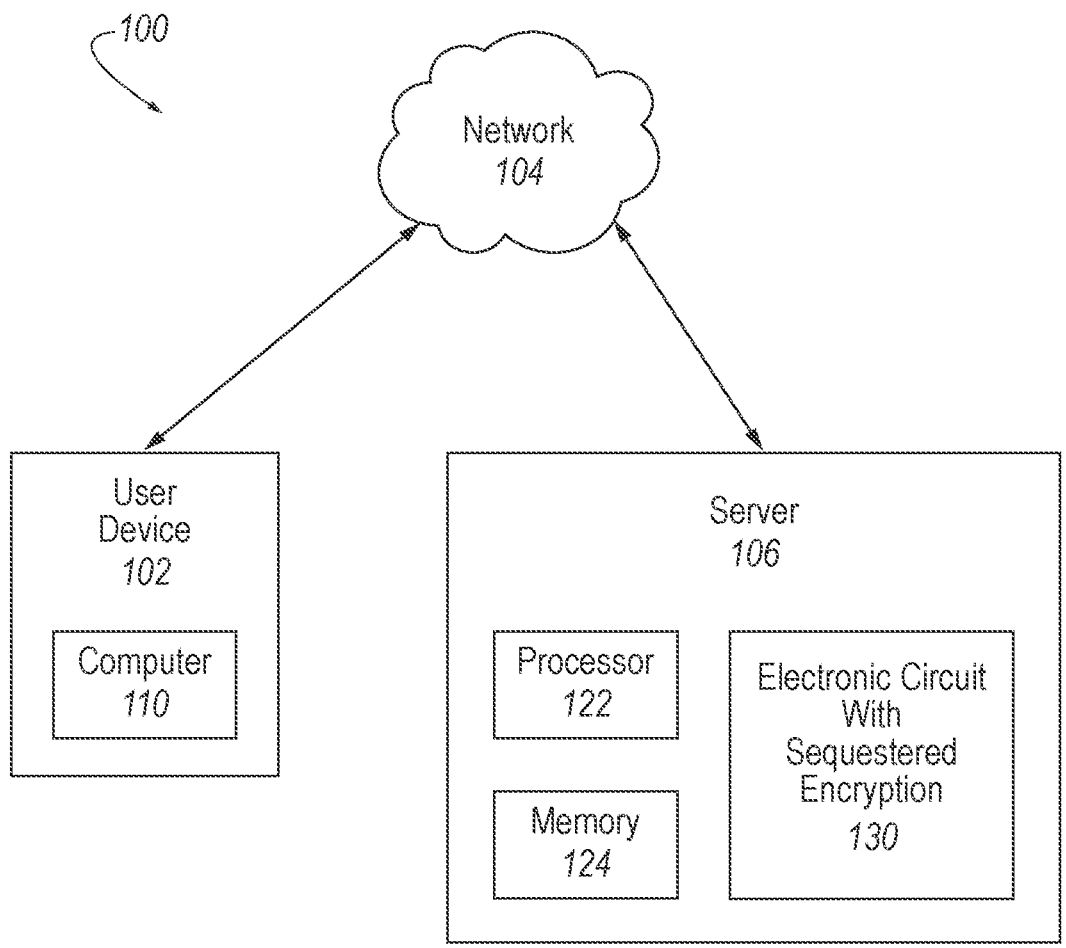
FIG. 1 is a block diagram of an example system for cloud-based services including an electronic circuit with sequestered encryption.

Disclosed herein is a system for processing data within an electronic circuit that utilizes only hardware for operations on secret data and for which the interface of the electronic circuit to other devices does not permit access to unencrypted secret data or data keys. The electronic circuit does not utilize or include any software and is therefore not vulnerable to software hacks. Further, operations performed on secret data within the electronic circuit have latencies that are independent of the secrets they are processing, do not use shared memory resources for secret data, and make decisions in a control-independent fashion, to protect secret data from side-channel attacks. Latency, as used herein, is an amount of time required to perform an operation. In an example, the system may further include data identifiers that permit the confirmation of the integrity and authenticity of a result from a sequence of operations performed on secret data. In this manner, it is possible for a user to execute a sequence of operations on encrypted secret data in hardware without disclosing the secret data in unencrypted form.

The system disclosed herein includes an electronic circuit. The electronic circuit includes a first set of electronic circuit elements electrically coupled to receive first secret data that was encrypted externally to the electronic circuit according to a data key and decrypt the first secret data based in part on parameters included in the data key. The electronic further includes a second set of electronic circuit elements coupled to generate second secret data by executing one or more operations on the first secret data. The electronic circuit further includes a third set of electronic circuit elements coupled to encrypt the second secret data based in part on the parameters included in the data key, thereby providing encrypted second secret data for output.

In the system, the first set of electronic circuit elements, the second set of electronic circuit elements and the third set of electronic circuit elements are mutually exclusive to each other.

In the system, the electronic circuit can include an interface that prevents access to unencrypted data including the data key, the first secret data, and the second secret data by computing devices external to the electronic circuit.

In the system, the electronic circuit can be organized as one or more synchronous state machines.

In the system, the first secret data and the second secret data can be encrypted based on a symmetrical encryption algorithm.

In the system, the electronic circuit can further include a fourth set of electronic circuit elements electrically coupled to receive configuration data that was encrypted externally to the electronic circuit according to a public key and decrypt the configuration data based in part on parameters included in a private key that is associated with the public key, wherein the private key is included in the electronic circuit and not accessible, either directly via a connection or indirectly via side channels, to computing devices external to the electronic circuit.

In the system, the configuration data can include the data key encrypted with the public key and the fourth set of electronic circuit element can decrypt the data key and store the data key in a data key register such that the data key is accessible by the first set of electronic circuit elements and the third set of electronic circuit elements.

In the system, the decryption of the first secret data can be performed solely based on the coupling of the first set of electronic circuit elements and the parameters from the data key. Further, the operations performed by the second set of electronic circuit elements can be executed solely based on the coupling of the second set of circuit elements. Further, the encryption of the second secret data can be performed solely based on the coupling of the third set of electronic circuit elements and the parameters from the data key; and the decryption of the configuration data is performed based solely on the coupling of the fourth set of electronic circuit elements and the parameters from the private key.

In the system, at least a part of the electronic circuit can be included in one of a Field Programmable Gate Array (FPGA), a custom integrated circuit, an Application Specific Integrated Circuit (ASIC), a Programmable Logic Array (PLA) or electronic circuit elements integrated on a substrate.

In the system, the electronic circuit can be electrically coupled such that each operation performed by the electronic circuit on secret data has a latency that is independent of a value of the secret data.

In the system, the one or more operations can include mathematical operations.

In the system, the one or more operations can include a Boolean operation or computation of a predicate. Further, when one of the operations yields an indeterminate, undefined, or invalid result, the second secret data can include an error code.

In the system, one of the operations can be a conditional move. The conditional move can: (a) receive as operands an encrypted predicate as a first secret value, an encrypted true value, and an encrypted false value; (b) decrypt the predicate, the true value and the false value; (c) set a result equal to the true value if the predicate equals the true value; (d) set the result equal to the false value if the predicate equals the false value; (e) encrypt the result; and output the encrypted result as a second secret data value.

The system of claim 1, wherein each of the first secret data and the second secret data is encrypted according to a high-entropy encryption algorithm, wherein each encryption of a same plaintext value yields a randomly selected different result.

The system can further include a computing device including a processor and a memory. The memory can include instructions executable by the processor such that the processor is programmed to send the encrypted first secret data to the electronic circuit and send operation identifiers identifying the operations to be executed by the second set of electronic circuit elements to the electronic circuit. The processor can further be programmed to receive the encrypted second secret data from the electronic circuit. Further in the system, the computing device can be prevented from accessing in decrypted form the data key or any secret operands or secret computational results including (1) the first secret data, or (2) the second secret data.

Further in the system, the computing device can be further programmed to receive, via wireless communications, configuration data encrypted based on a public key from a second computing device, receive the first secret data encrypted based on the data key from the second computing device, receive the operation identifiers identifying the operations to be executed by the second set of electronic circuit elements from the second computing device, and transmit the encrypted second secret data to the second computing device.

Further, in the system, the computing device and the electronic circuit can be included in a server programmed to provide cloud-computing services.

Further in the system, the wireless communications can include communications over the Internet.

FIG. 1 illustrates an example system 100 for providing a user access to a cloud-based service to perform operations on secret data by an electronic circuit with sequestered encryption 130 (the electronic circuit 130). In a non-limiting example, the electronic circuit 130 is included in a server 106 configured for cloud-computing services. Other configurations are possible. For example, the electronic circuit 130 may be included in a mobile or personal computing device such as a laptop computer, desktop computer, tablet, mobile telephone, etc. The electronic circuit 130 is electrically coupled to perform the operations based solely on the hardware and the electrical coupling. Herein, "with sequestered encryption" means that the electronic circuit 130 has an interface that prevents access to unencrypted secret data (i.e., any secret operands or secret computational results) and unencrypted data keys by computing devices external to the electronic circuit 130. Performing a sequence of operations by the electronic circuit 130 based solely on the hardware and the electrical coupling herein means that the operations are performed based on the coupling of electronic elements within the electronic circuit without the use of program code stored in memory. None of the operations on the electronic circuit 130 are performed as computer-readable instructions (i.e., software).

As described in detail below, the electronic circuit 130 includes a plurality of subcircuits dedicated to performing specific operations. Each subcircuit is a set of electronic circuit elements, electrically coupled to perform the respective specific operation. A sequence of operations herein means one or more operations arranged to be executed sequentially, i.e., one after the other, wherein each of the operations corresponds to one of the operations for which the electronic circuit 130 is electrically coupled to perform.

The system 100 includes a user device 102 in communication with the server 106 via a network 104. "In communication" herein means exchanging digital data and commands.

The user device 102 is a computing device providing a user access to network communications, data processing, electronic commerce, etc. Non-limiting examples of user devices 102 include mobile telephones, laptop computers, storage devices, and tablet computing devices. For ease of discussion, the system 100 will be described as having one user device 102. The system 100, can however, include many (e.g., hundreds or thousands) of user devices 102.

The user device 102 includes a computer 110 including a processor and a memory. The computer 110 is programmed for communication with the network 104. As described in additional detail below, the computer 110 is programmed to encrypt a user data key with a server public key and send the encrypted user data key to the server 106. The computer 110 is further programmed to encrypt secret data with the user's data key and send the encrypted secret data to the server 106. The computer 110 is still further programmed to send a sequence of operations to be performed by the server 106 on the secret data.

The network 104 represents one or more mechanisms by which the user device 102 can communicate with the server 106. Accordingly, the network 104 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), 5G/LTE, etc.), local area networks (LAN) and/or wide area networks (WAN), including the Internet, providing data communication services.

The server 106 can be a computing device programmed to provide operations including cloud-computing services. The server 106 includes a processor 122, a memory 124 and the electronic circuit 130. The processor 122 is programmed, for example based on instructions stored in the memory 124, for wireless communications via the network 104 with the user device 102. The processor 122 is further programmed to receive a data key encrypted based a public key that is associated with a private key and configure the electronic circuit 130 by sending the encrypted data key to the electronic circuit 130. The private key is included in the electronic circuit 130 and may further be associated with a cluster of additional sequestered encryption devices, for example, under control of an organization that provides the user access to computation on encrypted data. In an example, the sequestered encryption devices may be included in one or more servers 106, such that the servers 106 can work together on a same secret data set. The private key is protected within the electronic circuit 130 and other sequestered encryption devices from any type of digital communications with the respective electronic circuit or other sequestered encryption device. The processor 122 is further programmed to receive a sequence of operations and secret data from the user device 102, wherein the secret data is encrypted based on the data key. The processor 122 is still further programmed to execute the sequence of operations on the encrypted secret data by sequentially invoking the electronic circuit 130 to perform each of the operations.

Figure 2:
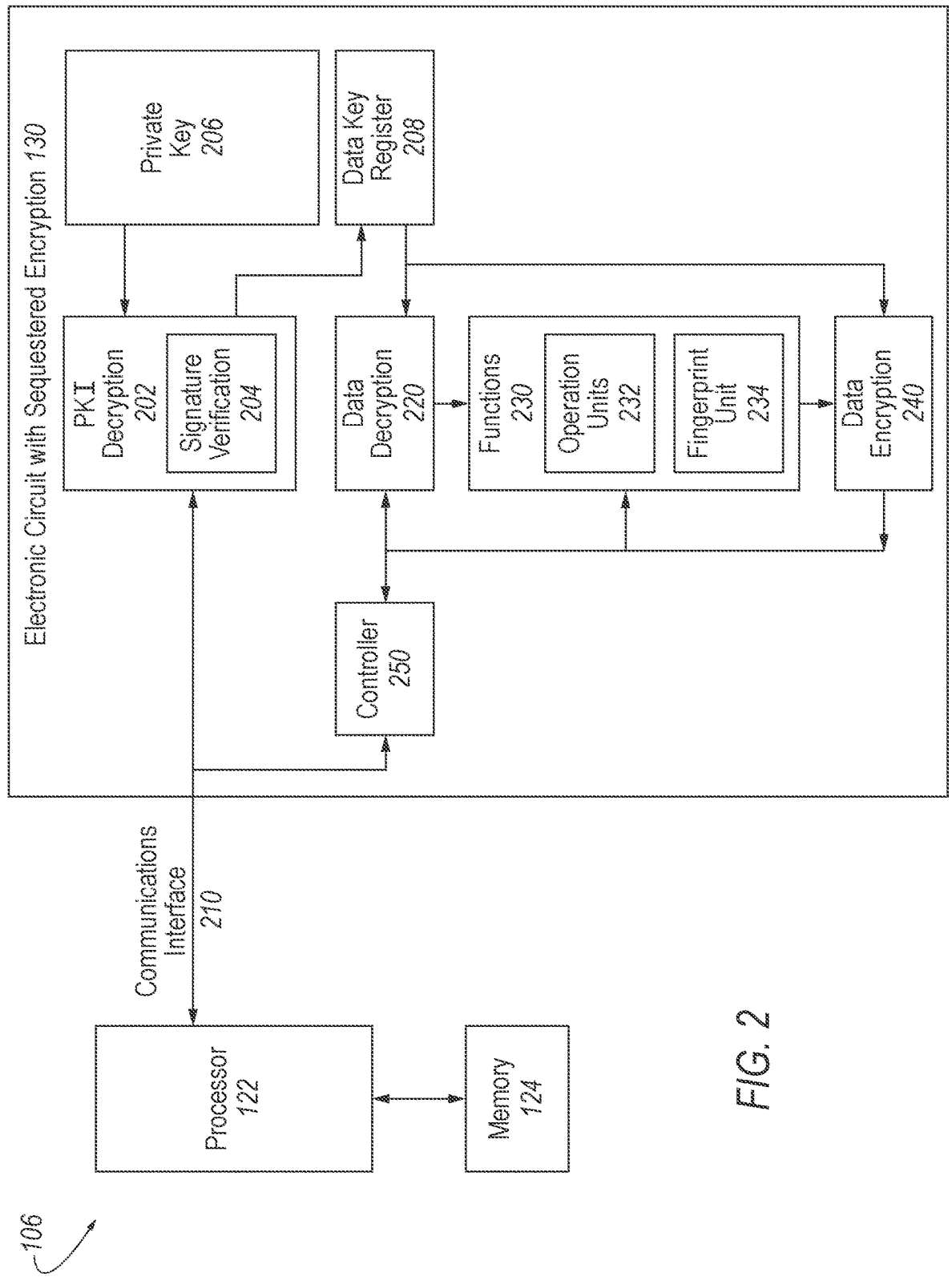
FIG. 2 is a block diagram illustrating an example server including the electronic circuit with sequestered encryption.

FIG. 2 illustrates the server 106 in additional detail. The processor 122 is communicatively coupled with the electronic circuit 130 via a communications interface 210. The communications interface 210 provides digital communications between the process 122 and the electronic circuit 130 and can be any configuration of wired or wireless communications systems and protocols. In a non-limiting example, the communications interface 210 can be a single communications bus, such as AXI or PCI-E. Other non-limiting examples for the communications interface include a custom interconnect, a USB port, or a network. Further, the communications interface may include two or more communications busses. As described below, the communications interface 210 exchanges both encrypted data and unencrypted data with the electronic circuit 130. As described in additional detail below, the encrypted data exchanged by the communications interface 210 includes data encrypted both on the basis of symmetrical and asymmetrical encryption algorithms.

As part of a configuration process, the communications interface 210 transmits Public Key Infrastructure (PKI) encrypted data to the electronic circuit 130. PKI based encryption is asymmetrical encryption that utilizes a public key and a private key. As non-limiting examples, RSA (Rivest-Shamir-Adleman) and Diffie-Hellman are known protocols for asymmetrical encryption with the use of a public key/private key pair. During the configuration process, and as described in additional detail below, the processor 122 utilizes the communications interface bus 210 to send a user data key and optionally a signature encrypted based on the public key associated with the server private key to the electronic circuit 130.

The communications interface 210 also sends and receives high-entropy encrypted secret data to the electronic circuit 130, wherein the encrypted secret data is encrypted based on a high-entropy symmetrical encryption protocol and a user data key (also referred to simply as the "data key" herein). A symmetrical encryption protocol can include an encryption algorithm and a decryption algorithm and is characterized in that it uses cryptographic keys that are the either the same for both the encryption of plaintext and the decryption of ciphertext, or for which there is a simple transformation between the encryption key and the decryption key. The encryption algorithm is a sequence of operations performed on received plaintext to generate the ciphertext. Similarly, the decryption algorithm is a sequence of operations performed on ciphertext to generate plaintext. The operation of both the encryption algorithm and decryption algorithm are based on parameters included in the data key. As an example, the data key could be a 256-bit key for the AES symmetric cipher algorithm. A data key for symmetrical encryption is typically a digital value of 128, 256 or more bits. A larger data key (more bits) or smaller data key (less bits) can be used if a trade-off is desired between performance and brute-force cryptographic strength. In an example, the symmetrical encryption protocol can include a high-entropy encryption algorithm. In this case, different encryptions of a same plaintext value yield different encrypted values. Examples of known high-entropy protocols include salted encryptions, where a value to be encrypted is combined with a large N-bit true-random bit sequence, thus rendering $2^N$ different representations for each value encrypted. Salted encryptions are encryptions that mix in random data to an encryption, to destroy any correlations between the value being encrypted and its associate ciphertext.

The communications interface 210 also sends, in unencrypted form, an operation or sequences of operations to be performed by the electronic circuit 130.

The electronic circuit 130 includes electronic circuit elements that are electrically coupled to perform operations. Electronic circuit elements as used herein are components that perform electrical functions such as passing current, switching current, switching voltage, storing charge, developing a voltage, etc. and include, as non-limiting examples: conductors; insulators; transistors such as bi-polar transistors, MOS transistors, CMOS transistors and other switchable devices; diodes, capacitors, and inductors. Electrically coupled as used herein means connected such that voltage levels can be transmitted and electrical currents can flow between nodes of respective electronic circuit elements in a manner determined by the coupling.

For ease of understanding, the electronic circuit 130 will be described below as comprising the following circuit blocks: a PKI decryption block 202, including a signature verification block 204; a private key block 206; a data key register 208; a data decryption block 220; a functions block 230 optionally including a plurality of operation units 232 and a fingerprint unit 234; a data encryption block 240; and a controller 250. These circuit blocks contain electronic circuit elements coupled to perform the functions of the respective block. The blocks may be distributed in the sense that the circuit elements for the respective block may be distributed throughout the electronic circuit 130. The different blocks can further be mutually exclusive in the sense that the individual blocks include dedicated electronic components that are only utilized to perform the function of the respective block, without an overlap of component use between the different blocks. The electronic circuit 130 can be organized as one or more synchronous machines. A synchronous state machine herein is an electronic circuit that can only be in a single state at a time, and advances from state to state synchronized to a clock. In an example, each of the blocks individually or collectively may operate as a synchronous state machine.

The electronic circuit 130 may be designed, for example by describing the operation or set of operations of the electronic circuit 130 based on an instruction set architecture which describes a set of basic operations (e.g., add, sub, mult, cmov) that can provide secret computation for programming languages such as C++, Python, etc. The circuit operations can be designed, for example, in Verilog, as a hardware description language, thus generating a hardware design that can execute the secret computations necessary to support program-level secret computations. The Verilog tool can then implement a coupling of a set of electronic circuit elements to perform the operation or set of operations. Following implementation of the coupling of electronic circuit elements by Verilog, the circuit elements are "synthesized" to perform the operation for which they were coupled. That is, they are electrically coupled to perform the operation or set of operations. As non-limiting examples, the electronic circuit 130 can be implemented as one or a combination of Field Programmable Gate Array(s) (FPGA), custom integrated circuit(s), Application Specific Integrated Circuit(s) (ASIC), Programmable Logic Array(s) (PLA) or electronic circuit(s) integrated on a substrate.

In an example, a Field Programmable Gate Array (FPGA) containing uncoupled, or partially uncoupled, electronic circuit elements can be electrically coupled based on the output of the Verilog program to perform the desired operation or set of operations. In some cases, the coupling generated based on the Verilog program can be permanent. In other cases, the coupling may be erasable, such that the FPGA may be reused for other applications.

As another example, the output of the Verilog tool can be used to design an application specific integrated circuit, that is then manufactured according to standard semiconductor manufacturing techniques.

The PKI (Public Key Infrastructure) decryption block 202 receives PKI encrypted configuration data from the processor 122 including a user data key and an optional digital signature. Separately, according to the design of the electronic circuit 130, the PKI decryption block 202 receives as an input from the private key block 206 the value of a private key associated with the server 106.

The PKI decryption block 202 decrypts configuration data received from the processor and extracts from the configuration data the user data key and the optional signature. The user data key can be, for example, a random number generated by the user. The signature as used herein is a well-known value that the electronic circuit 130 can look for after decryption to know with confidence that the message that was decrypted was valid. The PKI decryption block 202 is electrically coupled to store the user data key in the data key register 208. The PKI decryption block 202 is further electrically coupled to provide the signature to the signature verification block 204 which, as described below, verifies the signature. The PKI decryption block 202 is further electrically coupled to encrypt the message based on the user data key and send the encrypted message to the user device 102.

The PKI decryption block 202 receives the configuration data that has been encrypted according to a known encryption algorithm based on parameters from a public key supplied to a user. The PKI decryption block 202 then decrypts using a known decryption algorithm associated with the encryption algorithm and further based on parameters from a private key that is associated with the public key.

Optionally, the PKI decryption block 202 may include the signature verification block 204. When available, the signature verification block 204 can verify the received signature. In an example, the signature verification block 204 compares the decrypted signature with an expected value for the decrypted signature. The signature verification block 204 determines that the received message (and therefore the data key) was valid if the decrypted signature matches the expected decrypted signature.

The private key block 206 is electrically coupled to provide the value of the private key for the electronic circuit 130 to the PKI decryption block 202. In an example, the private key block 206 may be a set of connections, one for each bit of the private key, to either of a first high potential, which typically can be a supply voltage for the electronic circuit 130, or a second low potential, which typically can be the ground (oV) potential for the electronic circuit 130. The connections can be provided to the PKI decryption block 202 as input data that control the operation of the PKI decryption block 202. As an example, for a private key including 2048 bits, the private key block 206 can provide 2048 connections to the PKI decryption block 202, with each connection connected either to the first high potential or the second low potential.

The data key register 208 is a digital data storage circuit electrically coupled to store the decrypted user data key and can be arranged to store, as many bits as are required for the data key for symmetrical encryption, for example 128 or 256 bits. The data key register 208 receives user data key from the PKI decryption block 202 during configuration of the electronic circuit 130 for a user. The data key register 208 provides the value of the user data key to other circuit blocks within the electronic circuit 130 including the data decryption block 220 and the data encryption block 240.

The data decryption block 220 is electrically coupled to receive an encrypted secret data block via, for example, the second communications bus 212. The encrypted secret data block includes secret data and may further include a data identifier associated with the secret data. A data identifier herein is a unique digital value associated with the secret data that can be used to confirm the progeny of the secret data. The data identifier reflects operations that have been performed to generate the secret data but is independent of the value of the secret data with which it is paired. A data identifier may also be referred to herein as a computational fingerprint.

Upon receiving the encrypted secret data block, the data decryption block 220 is further electrically coupled to decrypt the encrypted secret data block and provide the (decrypted) secret data to the functions block 230. The data decryption block 220 can perform the decryption algorithm associated with a known encryption protocol, as described above, wherein operation of the decryption algorithm is based in part on parameters included in the data key. When a data identifier is included in the secret data block, the data decryption block 220 also provides the (decrypted) data identifier associated with the secret data to the functions block 230.

The functions block 230 is electrically coupled to perform an operation selected from a set of available operations on one or more first secret data and generate a second secret data. The functions block 230 may be organized to include one or more operation units 232 for performing respective operations on secret data, and further to include a fingerprint unit 234 for calculating data identifiers associated with secret data. Unless otherwise specified, the terms first secret data will be used herein to describe secret data input to the functions block 230 as operands for an operation and second secret data will be used herein to describe secret data output from the functions block 230 for the operation. Each operation may have one or more first (input) secret data and one or more second (output) second data. In some cases, for example, when an operation includes a sequestered accelerator, there could be many (tens, hundreds, or more) first secret data. The first data identifier and second data identifier are the data identifiers associated respectively with the first secret data and the second secret data. In a sequence of operations, the second secret data and second data identifier from an operation can be (and typically are) the first secret data and first data identifier for a subsequent operation in the sequence.

The functions block 230 can include one or more operation units 232, wherein each operation unit 232 is a separate, dedicated set of electronic components electrically coupled to perform an operation and further wherein each of the sets of electronic components is mutually exclusive. That is, for example, a first set of electronic components, ADD_ENC 232, may be electrically coupled to perform an add operation, a second set of electronic components MUL_ENC 232 may be electrically coupled to perform a multiply operation, etc.

The available operations can be mathematical operations such as addition, subtraction, etc., and can further include, as non-limiting examples, operations such as Boolean operations, conditional moves, and data grants. The operation of data grants, that allow the outputting of selected decrypted secret data to a user, is described below. The functions block 230 is electrically coupled to perform each operation with a latency that is independent of the first secret data on which it is operating and further independent of second secret data generated by the operation. Further, to protect the confidentiality of secret data, an operation cannot publicly declare that a fault has occurred, as the declared fault condition can provide information relative to the secret data. As an alternative, in a case that the operation yields an indeterminate, undefined or invalid result, the second secret data output by the operation (as encrypted data) can include an error code in order to inform the user of the fault. Example operations that may be performed by the functions block 230 are discussed below.

The operation to be performed is selected from the set of available operations based on operation identifiers received from the processor 122, via the second communications bus 212. For example, the functions block 230 can receive an operation identifier identifying which of the available operations should be performed on the first secret data from the processor 122.

As a non-limiting example, a RISC-like operation set can be implemented by the functions block 230. Table 1 lists an example interface between the processor 122 and the functions block 230 within the electronic circuit 130.

TABLE 1

Example Operations for the Functions Block 230

| Opcode | Semantics | Example Command |
|---|---|---|
| dst := src1 <op> src1 | Arithmetic: +, −, *, /, . . . | ADDD_ENC, SUB_ENC, MUL_ENC, DIV_ENC |
| pred := src1 <rel> src2 | Relational Test: <, ==, . . . | SEQ_ENC, SLTU_ENC, STLS_ENC |
| dst := CMOV (pred, src1, src2) | Conditional Move | CMOV_ENC |

Additionally or alternatively, more complex algorithmic functions may be included in the functions block 230, for example in the form of hardware accelerators.

In an example, the ADD_ENC command is sent to the electronic circuit 130 with two encrypted secret values, which are then decrypted, added together, and then the result is encrypted and returned to the processor 122. The SUB_ENC, MUL_ENC, and DIV_ENC perform similar operations for subtraction, multiplication, and division respectively.

In order to provide protection against side-channel attacks, the operations can be designed to abide by two constraints: (1) that the operation execute with a latency that is independent of the secret data, and (2) the operation cannot publicly declare a fault condition. These conditions can be understood by considering a DIV_ENC operation.

An operations unit DIV_ENC can be designed, as described above, to execute a divide operation with a latency that is independent of the secret data on which it operates. In the case of the DIV_ENC operation, however, there is also the possibility that a value will be divided by zero, resulting in a fault condition. To prevent the public declaration of the fault condition, the DIV_ENC command can be executed such that, after a fixed amount of time that is independent of secret data being operated on by the operation and further independent of the occurrence of the fault condition, a fault indicator can be embedded in the encrypted output of the operation and output by the operation. The fault indicator can be propagated to any later results of the sequence of operations, such that the user (or whomever decrypts the final value) can know that an operation in the sequence of operations was affected by a computational fault such as divide-by-zero. Examples of other commands and their implementation in operation sequences are provided below.

In the case that the first data identifiers associated with the first secret data are provided, the functions block 230, in the fingerprint unit 234, calculates a second data identifier associated with the second secret data. The second data identifier can be used to authenticate that the second secret data has been processed by an expected sequence of operations. As described in additional detail below, calculating the second data identifier includes the steps of concatenating the one or more first data identifiers for an operation together with an operation identifier for the operation, and any non-secret input data to the operation to create a data to be hashed, and then performing a hash function on the data to be hashed.

Upon completing an operation, the functions block 230 is electrically coupled to output the second secret data and when available, the second data identifier, to the data decryption block 240.

The data encryption block 240 is electrically coupled to generate a second encrypted secret data block by encrypting the second secret data and when available the second data identifier. The data encryption block 240 may perform the encryption based on a known encryption algorithm, parameterized by the user data key. The encryption algorithm can be the counterpart to the decryption algorithm applied to secret data as described in reference to the block 220 above. Upon generating the second encrypted data block, the data encryption block 240 may output the second encrypted data block to the controller 250, which can, for example, direct the second encrypted data block to the second communications bus 212.

The controller 250 controls the flow of data on the communications interface 210 and further, based on operations received from the processor 220, controls operations of the electronic circuit 130. That is, the controller 250 can receive an operation identifier of an operation to be performed by the electronic circuit 130 and input data for the operation from the processor 122. The input data can include non-secret data and/or secret data. Based on the operation, the controller 250 can direct the data decryption block 220 to decrypt the secret data and provide the secret data to the functions block 230. The controller can further direct the non-secret data to the functions block 230. The controller 250 can further direct the operation identifier to the functions block 230 to select the operation to be performed and execute the operation. Following execution of the operation by the functions block 230, the controller 250 can receive a second encrypted secret data block from the data encryption block 240 and direct the second secret data block to the processor 122.

As described above, in addition to arithmetic operations, to support more complex computation, the electronic circuit 130 can support the computation of predicates, Boolean expressions, and conditional moves.

As an example of a Boolean operation, the electronic circuit 130 can include an operation that compares two encrypted values to produce an encrypted predicate value, e.g., an encrypted true or false. Boolean operations are typically used in software to make control decisions, via conditional branches at the instruction level. To preserve the confidentiality of secret data, however, program branches and jumps cannot be influenced by the secret data. Allowing program branches and jumps to be influenced by secret data would provide a control side channel to discover a secret value by examining the execution sequence of the program.

associated with the "true" and "false" conditions of the predicate. Then, using the CMOV primitive, the encrypted Boolean can be evaluated in the functions block 230 and the appropriate true or false result value can be selected as the result of the CMOV operation. Since the result will pass through the encryption block 240 that applies high-entropy encryption, any prospective attacker cannot infer which decision was made since the result of the CMOV will not resemble either of its "true" or "false" input values. Thus, the CMOV primitive enables the electronic circuit 130 to perform decision processing in a secret and secure manner.

The following is an example of a sequence of operations written in C++ that can be performed on encrypted data that utilizes Boolean expressions and the CMOV_ENC operation included in the electronic circuit 130.

```
// compare string S (SEALED) to STR (SEALED), returns signed integer (SEALED) indicating comparison
MesoSealedInt
SealedString::compare (Sealedstring s)
{
  Unsigned int i;
  MesoSealedBool done = false, trueVal = true;
  MesoSealedInt result = 0, minus 1 = −1, plus1 = 1, zero = 0;
  For (i=0; (i < allocSize) &&(i < s.allocSize); i++)
    {
      MesosealedBool mismatch = ((len > i) && (s.len > i)) && (str[i] != s.str[i]);
      MesosealedBool endpoint = (((len−1) = = i) | | (s.len−1) = = i);
      result = CMOV_ENC ((!done && mismatch), CMOV_ENC ((str[i] < s.str[i]), minus1, plus1), result);
      done = CMOV_ENC ((!done && mismatch), trueVal, done);
      result = CMOV_ENC ((!done && endpoint), CMOV_ENC ((len = = s.len), zero, CMOV_ENC((len <
         s.len), minus 1, plus1)), result);
      done = CMOV_ENC ((!done && endpoint), trueVal, done);
    }
  Return result;
}
```

A cmov primitive, as can be provided in the electronic circuit 130, is a mechanism to make program decisions in a control independent fashion, such that decisions can be made by the program while at the same time protecting the secret data from analysis/discovery that would otherwise be possible by examination of the program execution.

The CMOV primitive has the following format:
CMOV_ENC pred, true_val, false_val
with the following semantics:
result=encrypt(decrypt(pred)?decrypt(true_val):decrypt (false_val))
where pred is a Boolean first secret data value, true_val is an encrypted true value (i.e., representing a true condition) and false_val is an encrypted false value (i.e., representing a false condition).

That is, the cmov primitive:
a. receives as operands a predicate (pred, the first encrypted secret data value), an encrypted true value (true_val), and an encrypted false value (false_val);
b. decrypts the predicate, the true value, and the false value;
c. sets the result equal to the true value if the predicate equals the true value;
d. sets the result equal to the false value if the predicate equals the false value;
e. encrypts the result; and
f. outputs the encrypted result as a second secret data value.

The decision security is implemented by having sequences of operations execute both the code sequence In the example, the Meso* variable and functions are all electronic circuit 130 specific objects. In addition, the compiler is directing computation on the Meso* variables to the electronic circuit 130, via C++ operator overloading or similar capable methods. In the encrypted string search, a main loop iterates over all of the string characters, without knowing the length of the string. At each step of the loop, the mismatch predicate determines if the string being searched matches the current search string character. The outcome of this test is precise, but unknown to the programmer since both the string, search string, and comparison predicate are encrypted. The endpoint predicate determines if the current character comparison is the last to be performed, either due to the end of the string or the search string. Once the loop predicates are computed, the loop statements 1) compute the sense of the comparison if the search is completed (greater than, less than, equal), 2) signal a mismatch, or 3) continue comparing. Once a solution is determined, it is not known to the software (operating in the processor 122), thus the software continues processing the loop even after a search solution is potentially found, until all possible search locations have been visited.

Optionally, the electronic circuit 130 can be enhanced to also verify the integrity of a computation. This security measure ensures that a sequence of operations that was previously submitted to the server 106 for execution by the electronic circuit 130 was not subsequently changed, for example by an attacker. In an example, the electronic circuit 130 can further include a fingerprint unit 234 that is electrically coupled to process data identifiers. A data identifier herein is a unique digital value associated with a secret data that can be used to confirm the progeny of the secret data. In an example, a data identifier associated with a secret data from a user may be a unique number selected by the user. Secret data input by the user can be referred to herein as secret source data and the data identifier input by the user and associated with the secret source data can be referred as a secret source data identifier. For operations performed within the electronic circuit 130, subsequent data identifiers can be computed that are associated with the output secret data from the operation. These subsequent data identifiers can be computed as one-way hash functions of data identifiers associated with the input secret data of the operation, an operation identifier of the operation, and non-secret input data for the operation. Following is an example for determining a data identifier for an i'th operation in a sequence of operations, $ENCVAL_i$.

For an encrypted secret data block of an i'th operation in a sequence of operations, $ENCVAL_i$, is the encrypted value of a tuple $<CF_i, VAL_i>$, where $CF_i$ is the data identifier of an i'th result and $VAL_i$ is the actual value of value of operation result i. (i.e., an integer or floating-point value, etc.). The $ENCVAL_i$ tuple is encrypted under the data key:

$$ENCVAL_i = \text{encrypt}(<CF_i, VAL_i>). \quad \text{Eq. 1}$$

Then, for the following operation to be performed by the electronic circuit 130:

$SE_{op}$ $ENCVAL_x$, $ENCVAL_y$, $IMM_z$ where $SE_{op}$ is an identifier of the operation to be performed by the electronic circuit 130, $ENCVAL_x$ is the encrypted result from a previous operation x, $ENCVAL_y$ is the encrypted result from a previous operation y, and $IMM_z$ is an immediate non-secret value also used in the operation, the second data identifier of the operation i, $CF_i$, can be computed as:

$$CF_i = \text{one-way-hash}(<SE_{op}, CF_x, CF_y, IMM_z>) \quad \text{Eq. 2}$$

The one-way-hash( ) can be an appropriate cryptographic one-way hash function (e.g., SHA-1). The equation above is an example calculation of a data identifier for an operation with two operands, $ENCVAL_x$ and $ENCVAL_y$. Many variations are possible in this scheme. For instance, regardless of the amount, all operands will have to be incorporated into the fingerprint hash. Also, the order of the values being hashed for a given instruction is not important, as long as it is consistent for every execution of the corresponding operation performed by the electronic circuit 130. In addition, if multiple immediate values are utilized, all of their information must be incorporated into the fingerprint computation.

Figure 3:
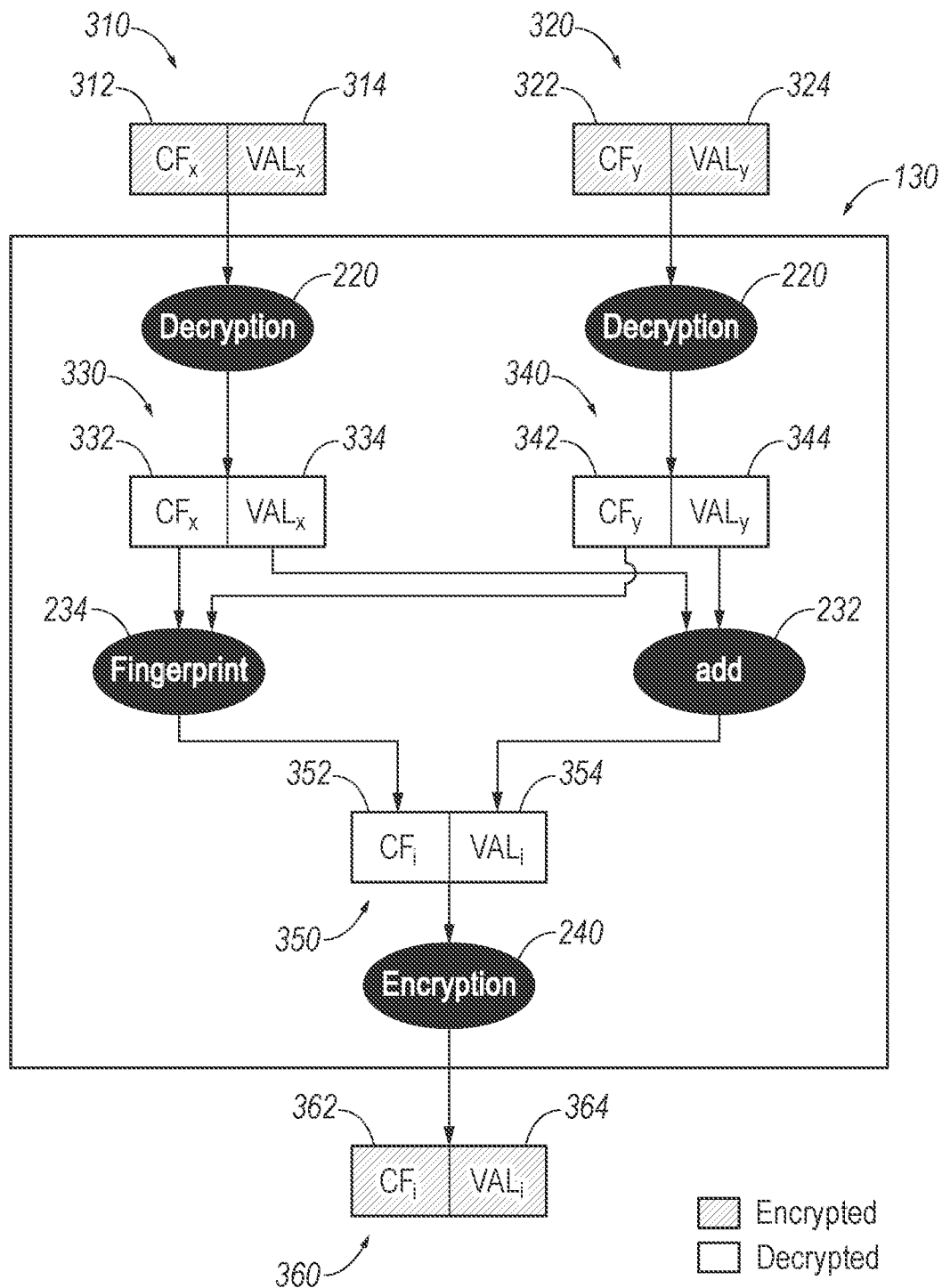
FIG. 3 is a flow chart of an example process for an adder including processing of data and data identifiers.

As an example, an "add" operation on secret data, including the use of data identifiers is presented according to the flow diagram of FIG. 3. In the example operation, the electronic circuit 130 receives a first encrypted secret data block$_x$ 310 and a first encrypted secret data block$y$ 320. The first encrypted secret data block$_x$ 310 includes a encrypted data identifier $CF_x$ 312 and a first encrypted secret data $VAL_x$ 314. The first encrypted secret data block$y$ 320 includes a first encrypted data identifier $CF_y$ 322 and a first encrypted secret data $VAL_y$ 324.

The electronic circuit 130 then decrypts, in the decryption block 220, the first encrypted secret data block$_x$ 310 and the first secret encrypted data block$y$ 320 to generate respectively a first secret data block$_x$ 330 and a first secret data block$y$ 340. The first secret data block$_x$ 330 includes, in decrypted form, a first data identifier $CF_x$ 332 and a first secret data $VAL_x$ 334. The first secret data block$y$ 340 includes, in decrypted form, a first data identifier $CF_y$ 342 and a first secret data $VAL_y$ 344.

Next, the functions block 230, in the fingerprint unit 234, calculates a second data identifier $Cf_i$ 352. To do this, the fingerprint unit 234 concatenates the first data identifier $CF_x$ 332 and the first data identifier $CF_y$ 342 to generate a data to be hashed and then applies a one-way hash function to the data to be hashed to generate the second data identifier $Cf_i$ 352. Note that the calculation of the second data identifier $Cf_i$ 352 is independent of the values of the first secret data $VAL_x$ 334 and the first secret data $VAL_y$ 344.

The functions block 230 also performs the add function in the add unit 232. That is, the add unit 232 adds the value of the first secret data $VAL_x$ 334 and the first secret data $VAL_y$ 344 to generate the second secret data $VAL_i$ 354.

The functions block 230 then forms a tuple of the second data identifier $Cf_i$ 352 and the second secret data $VAL_i$ 354 to generate a second secret data block$_i$ 350. The encryption block 240 then encrypts the second secret data block$_i$ 350 to generate the encrypted second secret data block$_i$ 360, including the encrypted second data identifier $CF_i$ 362 and the encrypted second secret data $VAL_i$ 364.

An important feature of data identifiers is that the values of the data identifiers are independent of the secret data with which they are paired. In order to prevent data identifiers from being changed by decisions on the secret data, the data identifiers can be used in conjunction with CMOV operations. The CMOV primitive makes a program decision in a control-independent fashion. That is, it implements a decision that has no effect on what computation is being run. This same primitive also stops the creation of control side channels which is important to the overall security of the electronic circuit 130.

As noted above, the CMOV operation has the format:
CMOV_ENC pred, true_val, false_val
with the following semantics:
result=encrypt(decrypt(pred)?decrypt(true_val):decrypt (false_val))
where pred is a Boolean first secret data value, true_val is an encrypted true value (i.e., representing a true condition) and false_val is an encrypted false value (i.e., representing a false condition).

As such, any secret computations will have to compute both the results of the true-condition and false-condition, which will result in the fingerprint of this operation (which includes CMOV, $CF_{pred}$, $CF_{true\_val}$, and $CF_{false\_val}$) being independent of any decisions made by the CMOV primitive. For security reasons, it is important that the true_val and false_val be decrypted and then re-encrypted with a high-entropy cipher included in the electronic circuit 130. Otherwise, an attacker can trivially discover the Boolean value of the pred, by simply looking at which of the two source values was passed to the result. With a high-entropy cipher, all results are purely random from the perspective of an attacker.

The privacy-preserving computation provides an infrastructure for data identifiers that is not available with traditional non-private computing models (e.g., general-purpose computing). First a privacy-enhanced computation environment prevents secret data values from affecting the control flow of a program, since these values are not visible to the program or programmer. In addition, by embedding data identifiers into the encrypted data values, attackers are not able to know these values or manipulate them, short of breaking the cryptography. Further, by packaging the data identifier and the secret value in the same encrypted packet, both the data identifier and the secret value are simultaneously destroyed if the ciphertext is manipulated.

Data grants are another example of an operation that can be performed by the electronic circuit 130 that includes computation of data identifiers. Data grants leverage data identifiers to safely release privacy-preserving secrets from a sequence of operations on secret data. In a data grant operation, a specific value produced in a sequence of operations can be released by permission of the data owner. In an example, information related to a data grant is prepared and encrypted by the data owner. This prevents people other than the data owner from making a data grant for a particular algorithm. Further, changes to an algorithm, through program updates or malicious hacking, will render data grants made for that algorithm invalid. Thus, a data grant, i.e., the release of encrypted secret data, only works if the data identifiers have not been corrupted—this property is required since otherwise, attackers could misuse data grants to release other secret information. Following is a description of the operation of a data grant.

A data grant for the result of an operation i is composed of the following information:

$DG_i$=encrypt($CF_i$)

The electronic circuit 130 supports an additional instruction for data grants:

$SE_{datagrant}$ $DG_i$, $ENCVAL_i$

With the semantics:

if (decrypt($DG_i$)==decrypt($ENCVAL_i$).$CF_i$) then result<=decrypt($ENCVAL_i$).$VAL_i$ else #security-violation This operation will receive as inputs an encrypted expected second data identifier $DG_i$ for an i'th operation, and the second secret data block $ENCVAL_i$ from the i'th operation. The operation will decrypt the data grant $DG_i$ with the data key and the fingerprint of the encrypted second secret data block $ENCVAL_i$, compare the two decrypted data identifiers, and if they match, the decrypted value of $ENCVAL_i$ is placed into a destination register of the electronic circuit 130. That is, the data grant operation will output the formerly secret value $ENCVAL_i$ in its decrypted form in the case that the expected second data identifier $DG_i$ equals the actual second data identifier $CF_i$. This is permitted since the equivalence of the two values signals two important conditions: 1) the data owner is permitting the program value associated with $DG_i$ to be decrypted and released, and 2) the secret computation has run until that same program point unimpaired by potential hackers trying to re-sequence the operations performed on the secret data. Note that a data grant can be made for any value, including non-privacy-preserving values. As such, data owners, working with program developers, must verify the conditions of the data grant they are releasing, to ensure that the information released is indeed privacy-preserving.

In an example the client can run a data identifier calculator to determine an expected data identifier for an operation from a sequence of operations. The data identifier calculator can be a program provided to the user, for example from the organization maintaining the server 106. The data identifier calculator can be used to calculate the expected data identifier for a data value subject to a data grant and may also be used to calculate the expected final data identifier for data that is output at the end of a sequence of operations.

For example, the computer 110 in the user device 102 can apply the data identifier calculator to generate an expected data identifier $CF_{xpctd}$ for a sequence of operations. As described above, a data identifier for an operation to be performed by the electronic circuit 130 can be calculated according to the equation $$CF_i = \text{one-way-hash}(<SE_{op}, CF_x, CF_y, IMM_z>), \quad \text{Eq. 2}$$

where, $CF_i$ is the second data identifier for the operation i'th operation, $SE_{op}$ is the operation identifier for the i'th operation, $CF_x$ is a second data identifier from a previous operation x, $CF_y$ is a second data identifier from a previous operation y and $IMM_z$ is an immediate non-secret value also used in the operation. The sequence of operations can be the sequence of operations leading up to a data grant operation, or an entire sequence of operations up to and including the final operation. The user can supply to the data identifier calculator the sequence of operations and the source data identifier to the data identifier calculator. Then, the user can invoke the data identifier calculator to calculate the expected data identifier $CF_{xpctd}$.

The use of data grant technology can be illustrated with an example of a voting machine. In this example, the electronic circuit 130 can safely disclose information about whether or not a vote matched a valid candidate in a privacy-preserving manner. The following pseudocode demonstrates this capability:

```
enc_int
CastCheckedSecretVote(enc_int secretVote, enc_int[ ] voteTallies,
        int numCandidates, enc_cfhash datagrant)
{
    enc_bool matched = false;
    for (int i=0; i < numCandidates; i++)
    {
        enc_bool match = (secretVote == i);
        matched = matched || match;
        voteTallies[i] = CMOV_ENC(match, voteTallies[i] + 1,
voteTallies[i]);
    }
    bool dec_matched = SE_DATAGRANT(datagrant, matched);
    if (!dec_matched)
        printf("Warning... your secret vote did not match a valid
candidate!\n");
    return voteTallies[i-1];
}
```

In the example, the DG variable datagrant is the encrypted data identifier of the final value assigned to the encrypted Boolean variable match. At the end of a voting algorithm, matched is true if a matching candidate received a vote and false if the vote cast did not match any valid candidate. Once this value is revealed, the if-statement in the program evaluates the value of the decrypted Boolean dec_matched, and if no valid candidate was selected, an error message is printed to notify the voter of the situation. It should be noted that if the datagrant ciphertext is corrupted in any way, the $SE_{datagrant}$ operation will fail. In addition, if the secret computation is changed in any way, the $SE_{datagrant}$ operation will also fail.

Data grants can be optionally signed by a third party to provide protection against malicious code trojans. This can be understood as a form of guardrailing that detects when anything in the execution of a sequence of operations changes, thereby providing a mechanism to prevent supply chain attacks. With the default use of data grants, developers will identify the data identifiers of sequences of operations and provide these data identifiers to data owners, which can then choose to encrypt and enable the release of select values from the sequence of operations. Through this mechanism, developers can secure secret computation from all forms of external software hacking on the system running the sequence of operations. An additional threat that data identifiers can address is that of malicious code trojans. A malicious code trojan is where a rogue developer secretly introduces code into a system to corrupt computation or exfiltrate sensitive data. Data identifiers can stop malicious code trojans by utilizing $3^{rd}$ party signing of data grants. Instead of program developers delivering data grants directly to data owners, the developers will provide the data grants to a $3^{rd}$ party that will then examine the secret computation code, attest via detailed code inspection that the data grant operation is not dangerous or malicious, and finally digitally sign the data grant with their private key (e.g., using RSA). Data owners can then authenticate the attested data grant by decrypting it with the public key of the attesting entity and then encrypting the data grant for using in validating a secret computation. Using this attestation approach, any malicious code trojans inserted into the secret computation will break the computational fingerprint and not allow the data grant to proceed. Short of stealing the private key of the attesting entity, this approach will prevent malicious code trojans within secret computations.

Figure 4:
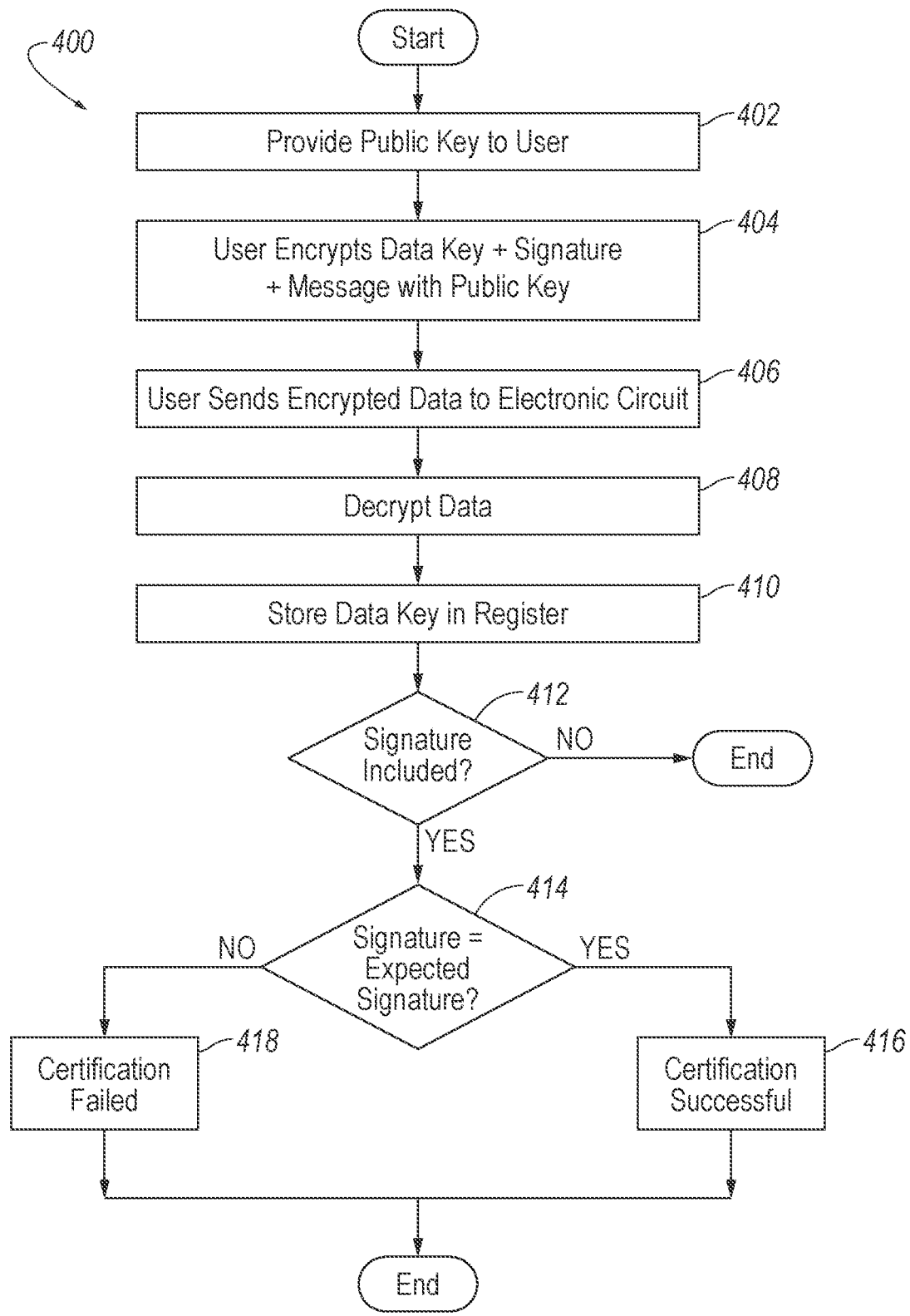
FIG. 4 is a flow chart of an example process for configuring the electronic circuit with sequestered encryption.

FIG. 4 is a flow chart of an example process 400 for configuring the electronic circuit 130 for a user by installing the user data key. In the process 400, the electronic circuit 130 receives a user data key encrypted based on a Public Key Infrastructure (PKI), stores the user data key, authenticates a digital signature associated with the sender of the user data key and returns a message to the user that has been encrypted based on the user data key. The process 400 begins in a block 402.

In the block 402, a certifying authority associated with the electronic circuit 130, for example the organization that maintains and commercializes the server 106, provides a public key for accessing the electronic circuit 130 to the user. The public key is associated with a private key included in the electronic circuit 130 such that data encrypted by an encryption algorithm using the public key can be decrypted within the electronic circuit 130 by a decryption algorithm using the private key. The organization may, for example, provide the public key to a potential user upon request by the user. The encryption algorithm and decryption algorithm may be well known and publicly available such that the user only requires the public key of the electronic circuit 130 in order to provide the encrypted data. As noted above, RSA and Diffie-Hellman are examples of known protocols for asymmetric public key/private key encryption. The process 400 continues in a block 404.

In the block 404, the user encrypts configuration data for the electronic circuit 130 using the public key according to a Public Key Infrastructure (PKI) asymmetrical encryption protocol such as RSA or Diffie-Hellman, as described above. The configuration data includes a data key for the user, and optionally a signature.

The data key for the user is a digital value that can be used by a symmetrical encryption algorithm to generate encrypted data, and further used by a decryption algorithm to decrypt the data. The data key can be a random number provided by the user. In non-limiting example, the data key may be 128 bits. Smaller (less bits) and larger (more bits) data keys can also be applied depending on the encryption and decryption algorithms employed by the system.

The signature is a digital value that can be used by the electronic circuit 130 to authenticate the configuration data. In an example, as described above, the signature can be a known digital value. The signature value is provided to the user by, for example, the organization maintaining the server 160, such that the signature will be compatible with the signature verification block 204 included in the electronic circuit 130.

Upon encryption of the configuration data, in the block 406, the user sends the encrypted data to the electronic circuit 130. The configuration data is sent from the user device 102 via the network 104 to the server 106. (FIG. 1). Within the server 106, the processor 122 receives the configuration data and then sends the configuration data to the electronic circuit 130. Alternatively, the user can provide access to the server 106 to data storage including the configuration data, and the server 106 can retrieve the configuration data.

In a block 408, the electronic circuit 130 decrypts the configuration data by applying a decryption algorithm and a private key. The private key can be a digital value that is paired with the public key used by the user, according to the selected Public Key Infrastructure (PKI) encryption protocol. Upon decrypting the configuration data by the electronic circuit 130, the process continues in a block 410.

In the block 410, the electronic circuit 130 extracts the data key from the configuration data and stores the data key in the data key register 208. The process continues in a block 412.

In the block 412, optionally, in the case that the configuration data includes a signature and the electronic circuit 130 includes the signature verification block 204, the process continues in a block 414. Otherwise, the process 400 ends.

In the block 414, the electronic circuit 130, for example in the signature verification block 204, verifies the digital signature included in the configuration data. In an example, the signature verification block 204 is electrically coupled to compare the signature extracted from the configuration data with an expected value for the signature. In the case that the signature included in the configuration data matches the expected an expected value, the electronic circuit 130 determines that the configuration data was valid and continues in a block 416. Otherwise, the process 400 continues in a block 418.

In the block 416, the electronic circuit 130 is ready to execute a sequence of operations on secret data. The process 400 ends.

In the block 418, the configuration of the electronic circuit 130 and the electronic circuit will not be able to perform operations on secret data. The process 400 ends.

Figure 5:
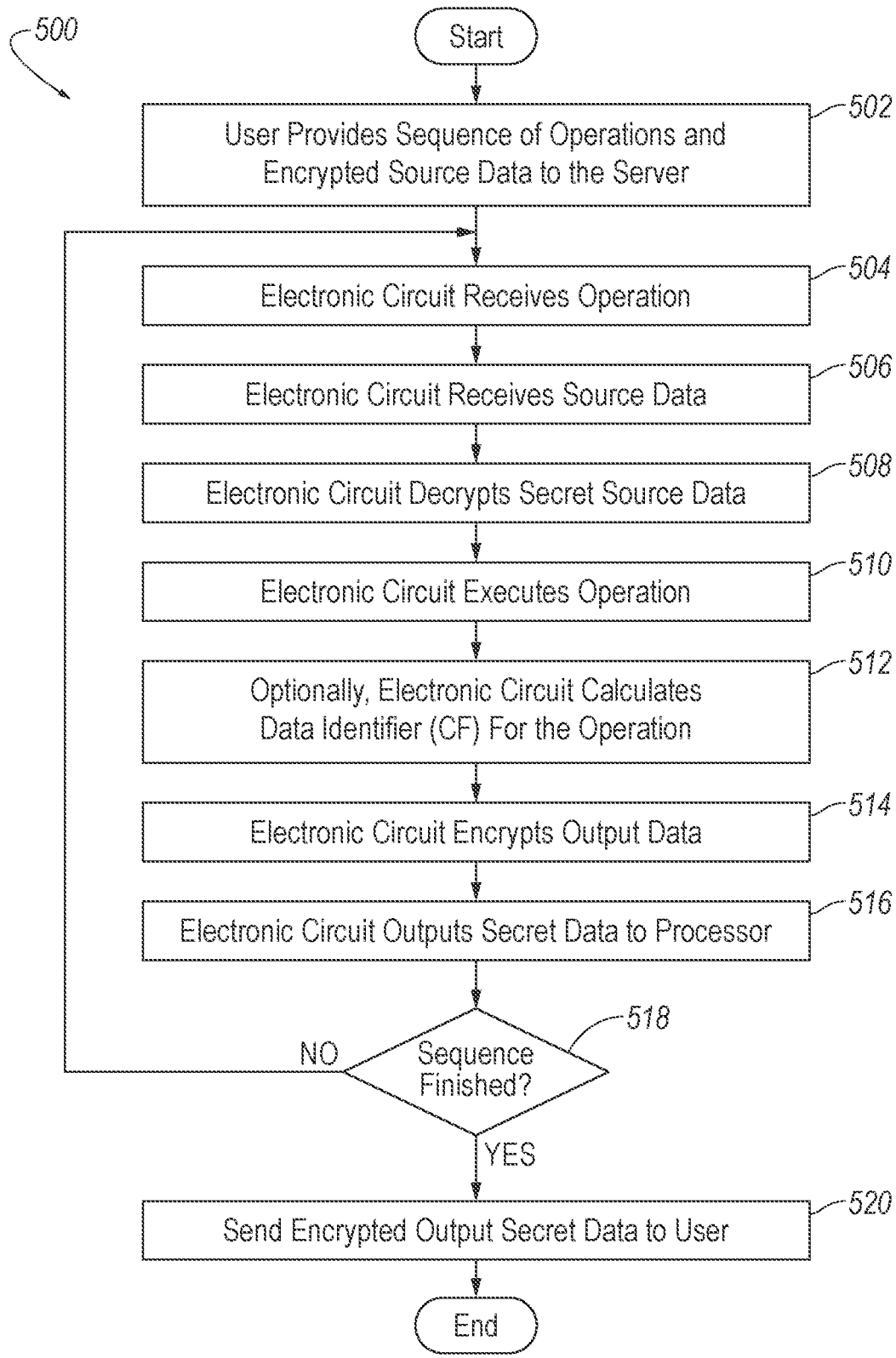
FIG. 5 is a flow chart of an example process for performing operations on data within the electronic circuit with sequestered encryption.

FIG. 5 is a flow chart of an example process 500 for performing operations on secret data within the electronic circuit 130. The process 500 begins in a block 502.

In the block 502, the user provides an encrypted first secret data block and a sequence of operations to be performed to the processor 122 in the server 106. The first secret data block can include user source secret data and may further include a user source data identifier. In an example, the user source secret data and user source data identifier can be combined in a tuple, and the tuple can be encrypted based on a symmetrical encryption protocol and a user data key.

Next, the in a block 504, the electronic circuit 130 receives an operation identifier identifying an operation to be executed from the processor 122.

Next, in a block 506, the electronic circuit 130 receives input data for the operation to be executed, wherein the input data can include non-secret data and can further include secret data, i.e., one or more first secret data blocks from the processor 122. The process 500 continues in a block 508.

In the block 508, based on the operation to be executed, the electronic circuit 130, for example, in the data decryption block 220, decrypts the first secret data according to a decryption algorithm and the user data key. Here, the decryption algorithm must correspond to the encryption algorithm used to encrypt the secret data. The data decryption block 220 then provides the (decrypted) secret data, and when applicable the data identifier, to additional circuitry in the electronic circuit 130 (e.g., the functions block 230) for further processing.

In a block 510, the electronic circuit 130 executes the operation to be executed on the secret data. For example, the functions block 230 can select, based on the operation identifier, a set of electrically coupled circuit elements to execute the operation. The electronic circuit 130 then provides the secret data to the selected set of electrically coupled circuit elements and executes the operation to generate a second secret data as an output of the operation. The process 500 then continues in a block 512.

In the block 512, in the case that the system 100 is electrically coupled to process data identifiers, the electronic circuit 130, in the fingerprint unit 234, calculates a second data identifier as described above. The fingerprint unit 234 creates an intermediate value by concatenating the data identifier for each input operand to an operation, each non-secret data input to the operation, and the operation identifier. The fingerprint unit 234 then applies a one-way hash to the intermediate value to generate the second data identifier for the operation.

For an example operation $SE_{op}, ENCVAL_x, ENCVAL_y, IMM_z$ where $SE_{op}$ is an identifier of the operation to be performed by the electronic circuit 130, $ENCVAL_x$ is the encrypted result from a previous operation x, $ENCVAL_y$ is the encrypted result from a previous operation y, and $IMM_z$ is an immediate non-secret value also used in the operation, the second data identifier of the operation i, $CF_i$, can be computed as:

$$CF_i = \text{one-way-hash}(<SE_{op}, CF_x, CF_y, IMM_z>). \qquad \text{Eq. 2}$$

Upon calculating the second data identifier of the operation i, $CF_i$, the process 500 continues in a block 514.

In the block 514, following the calculation of the second data identifier, the electronic circuit 130 encrypts a second secret data block based on the second secret data $VAL_i$ as generated in the block 510 and the second data identifier $CF_i$ as generated in the block 514. For example, the electronic circuit generates the tuple $<CF_i, VAL_i>$. The electronic circuit 130 then encrypts the tuple $<CF_i, VAL_i>$ to generate the second encrypted secret data block. The process 500 continues in a block 516.

In the block 516, the electronic circuit 130 outputs the encrypted second secret data block to the processor 122.

The processor 122, upon receiving the encrypted secret data block from the electronic circuit 130, determines whether the sequence of operations is complete. In the case that the sequence of operations is not yet complete, the process 500 continues in the block 504 and repeats the blocks 504 to 516 on a next operation in the sequence. In the case the sequence of operations is complete, the process 500 continues in a block 520.

In the case the block 520, the processor 122 sends the encrypted second secret data block to the user device 102. Note that in this case, the encrypted second secret data block is the result of the final operation of the sequence of operations and is therefore also the encrypted final secret data block, including the final secret data and the final data identifier from the sequence of operations. The process 500 ends.

Figure 6:
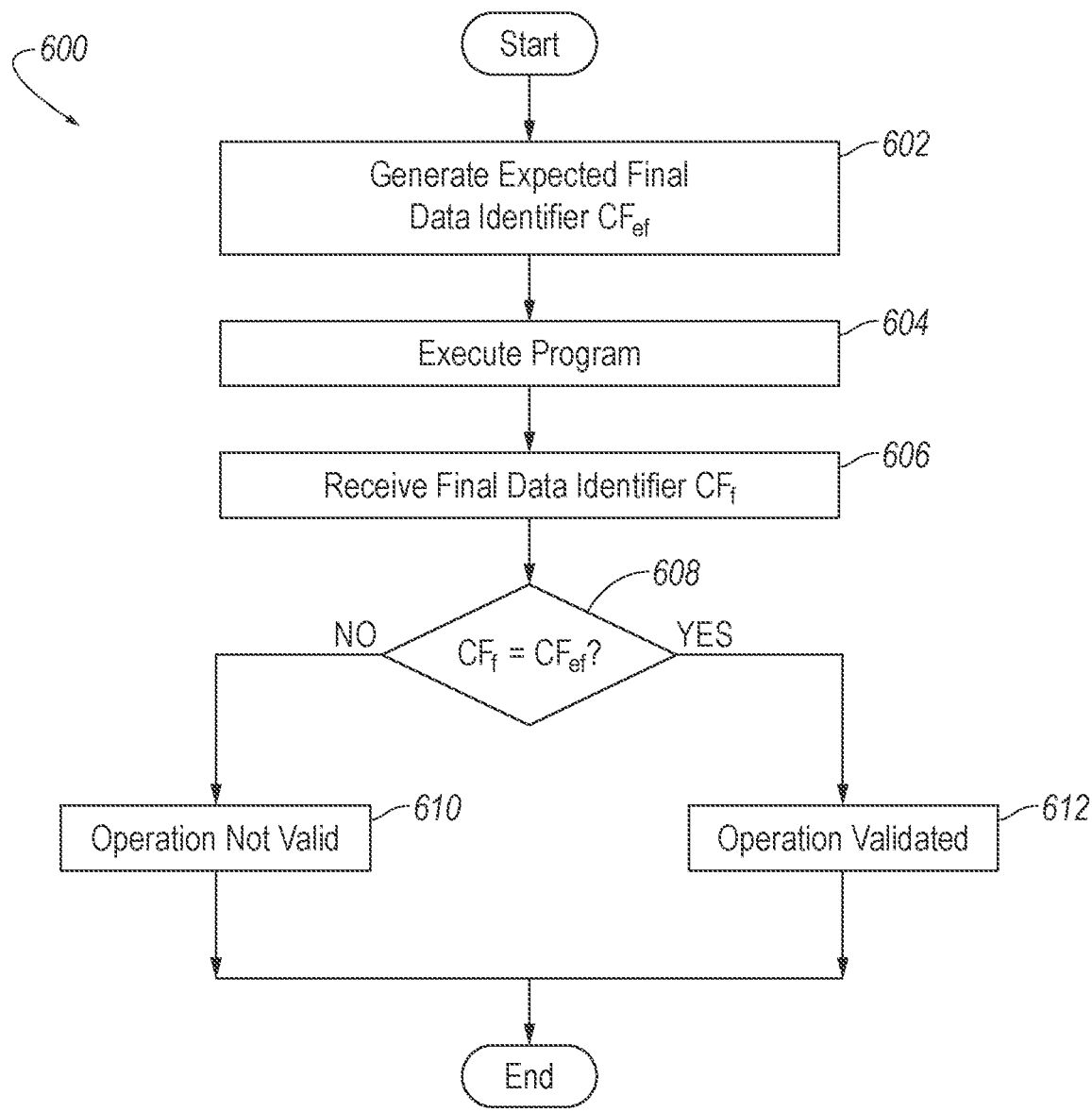
FIG. 6 is a flow chart of an example process for validating a sequence of operations performed on data.

FIG. 6 is a flow chart of an example process 600 for validating a sequence of operations performed on data by comparing an expected final data identifier $CF_{ef}$ with an actual final data identifier $CF_f$ for the sequence of operations. The process 600 begins in a block 602.

In the block 602, a computer, for example the computer 110 in the user device 102 generates an expected final data identifier $CF_{ef}$. As described above, the computer 110 can include a data identifier calculator that calculates an expected data identifier $CF_{xpctd}$ based on a known sequence of operations and an initial source data identifier $CF_{src}$ for each initial source secret data. The expected final identifier $CF_{ef}$ for a final operation in a sequence of operations then equals the expected data identifier $CF_{xpctd}$ output from the data identifier calculator. The user can input the sequence of operations and the initial source data identifier $CF_{src}$ and run the data identifier calculator to calculate $CF_{ef}$ for a final operation. Upon calculating the expected final data identifier $CF_{ef}$, the process 600 continues in a block 604.

In the block 604, the user executes the sequence of operations via the server 106 and the electronic circuit 130, as described in the process 500 above.

Upon completing the execution of the sequence of operations, the user device receives the final data identifier $CF_f$ from the server 106. The process 600 continues in a block 608.

In the block 608, the computer 110 included in the user device 102 compares the expected final data identifier $CF_{ef}$ with the final data identifier $CF_f$. In the case that the expected final data identifier $CF_{ef}$ does not equal the final data identifier $CF_f$, the process 600 continues in the block 610. In the case that the expected final data identifier $CF_{ef}$ equals the final data identifier $CF_f$, the process 600 continues in a block 612.

In the block 610, the computer 110 determines that an error has occurred, either in the calculation of the expected final data identifier $CF_{ef}$ or the actual final data identifier $CF_f$. The computer 110 can output a warning to the user indicating that the secret data resulting from the sequence of operations is not (or may not be) valid. The process 600 ends.

In the block 612, the computer 110 determines that the sequence of operations matches the expected sequence of operations and that the secret data resulting from the sequence of operations is valid. The process 600 ends.

Thus, is disclosed a system for processing secret data within an electronic circuit that utilizes only hardware for operations on secret data and for which the interface of the electronic circuit to other devices does not permit access to unencrypted secret data or data keys. The electronic circuit does not include any software in order to protect from software hacks. Operations performed on the secret data within the electronic circuit have a latency that is independent of the secret data, do not use shared memory resources for secret data, make decisions in a control-independent fashion, and do not declare fault conditions in order to protect secret data from side-channel attacks. The system may further include data identifiers that permit the confirmation of the integrity and authenticity of a result from a sequence of operations performed on secret data.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The term "based on" herein means based on in whole or in part.

The term "exemplary" is used herein in the sense of signifying an example, e.g., a reference to an "exemplary widget" should be read as simply referring to an example of a widget.

In the drawings, the same reference numbers indicate the same elements. Further, some or all of these elements could be changed.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:
   an electronic circuit including:
      a first set of electronic circuit elements electrically coupled to:
         receive first secret data that was encrypted externally to the electronic circuit according to a data key; and
         decrypt the first secret data based in part on parameters included in the data key;

a second set of electronic circuit elements electrically coupled to generate second secret data by executing one or more operations on the first secret data;

a third set of electronic circuit elements electrically coupled to encrypt the second secret data based in part on the parameters included in the data key, thereby providing encrypted second secret data for output; and a fourth set of electronic circuit elements electrically coupled to:

receive configuration data that was encrypted externally to the electronic circuit according to a public key; and decrypt the configuration data based in part on parameters included in a private key that is associated with the public key, wherein the private key is included in the electronic circuit and not accessible, either directly via a connection or indirectly via side channels, to computing devices external to the electronic circuit.

2. The system of claim 1, wherein the first set of electronic circuit elements, the second set of electronic circuit elements and the third set of electronic circuit elements are mutually exclusive to each other.

3. The system of claim 1, wherein the electronic circuit includes an interface that prevents access to unencrypted data including the data key, the first secret data, and the second secret data by computing devices external to the electronic circuit.

4. The system of claim 1, wherein the electronic circuit is organized as one or more synchronous state machines.

5. The system of claim 1, wherein the first secret data and the second secret data are encrypted based on a symmetrical encryption algorithm.

6. The system of claim 1, wherein:

the configuration data includes the data key encrypted with the public key; and the fourth set of electronic circuit element decrypts the data key and stores the data key in a data key register such that the data key is accessible by the first set of electronic circuit elements and the third set of electronic circuit elements.

7. The system of claim 1, wherein:

the decryption of the first secret data is performed solely based on the coupling of the first set of electronic circuit elements and the parameters from the data key;

the operations performed by the second set of electronic circuit elements are executed solely based on the coupling of the second set of circuit elements;

the encryption of the second secret data is performed solely based on the coupling of the third set of electronic circuit elements and the parameters from the data key; and the decryption of the configuration data is performed based solely on the coupling of the fourth set of electronic circuit elements and the parameters from the private key.

8. The system of claim 1, wherein at least a part of the electronic circuit is included in one of a Field Programmable Gate Array (FPGA), a custom integrated circuit, an Application Specific Integrated Circuit (ASIC), a Programmable Logic Array (PLA) or electronic circuit elements integrated on a substrate.

9. The system of claim 1, wherein:

the electronic circuit is electrically coupled such that each operation performed by the electronic circuit on secret data has a latency that is independent of a value of the secret data.

10. The system of claim 9, wherein the one or more operations include mathematical operations.

11. The system of claim 9, wherein the one or more operations include a Boolean operation or computation of a predicate.

12. The system of claim 9, wherein, when one of the operations yields an indeterminate, undefined, or invalid result, the second secret data includes a secret error code.

13. The system of claim 9, wherein one of the operations is a conditional move, wherein the conditional move:

a. receives as operands an encrypted predicate as a first secret value, an encrypted true value, and an encrypted false value;

b. decrypts the predicate, the true value, and the false value;

c. sets a result equal to the true value if the predicate equals the true value;

d. sets the result equal to the false value if the predicate equals the false value;

e. encrypts the result; and f. outputs the encrypted result as a second secret data value.

14. The system of claim 1, wherein each of the first secret data and the second secret data is encrypted according to a high-entropy encryption algorithm, wherein each encryption of a same plaintext value yields a randomly selected different result that will decrypt back to the original encrypted data.

15. The system of claim 1, further comprising a computing device including a processor and a memory, the memory including instructions executable by the processor such that the processor is programmed to:

send the encrypted first secret data to the electronic circuit;

send operation identifiers identifying the operations to be executed by the second set of electronic circuit elements to the electronic circuit; and receive the encrypted second secret data from the electronic circuit.

16. The system of claim 15, wherein the computing device is prevented from accessing in decrypted form the data key or any secret operands or secret computational results including (1) the first secret data, or (2) the second secret data.

17. The system of claim 15, wherein the computing device is further programmed to, via wireless communications:

receive configuration data encrypted based on a public key from a second computing device;

receive the first secret data encrypted based on the data key from the second computing device;

receive the operation identifiers identifying the operations to be executed by the second set of electronic circuit elements from the second computing device; and transmit the encrypted second secret data to the second computing device.

18. The system of claim 17, wherein the computing device and the electronic circuit are included in a server programmed to provide cloud-computing services.

19. The system of claim 17, wherein the wireless communications include communications over the Internet.

20. A system comprising:
an electronic circuit including:
  a first set of electronic circuit elements electrically coupled to:
    receive first secret data that was encrypted externally to the electronic circuit according to a data key; and
    decrypt the first secret data based in part on parameters included in the data key;
  a second set of electronic circuit elements electrically coupled to generate second secret data by executing one or more operations on the first secret data;
  a third set of electronic circuit elements electrically coupled to encrypt the second secret data based in part on the parameters included in the data key, thereby providing encrypted second secret data for output;
wherein:
  the electronic circuit is electrically coupled such that each operation performed by the electronic circuit on secret data has a latency that is independent of a value of the secret data; and
  one of the operations is a conditional move, wherein the conditional move:
    a. receives as operands an encrypted predicate as a first secret value, an encrypted true value, and an encrypted false value;
    b. decrypts the predicate, the true value, and the false value;
    c. sets a result equal to the true value if the predicate equals the true value;
    d. sets the result equal to the false value if the predicate equals the false value;
    e. encrypts the result; and
    f. outputs the encrypted result as a second secret data value.

21. The system of claim 20, wherein the first set of electronic circuit elements, the second set of electronic circuit elements and the third set of electronic circuit elements are mutually exclusive to each other.

22. The system of claim 20, wherein the electronic circuit includes an interface that prevents access to unencrypted data including the data key, the first secret data, and the second secret data by computing devices external to the electronic circuit.

23. The system of claim 20, wherein the electronic circuit is organized as one or more synchronous state machines.

24. The system of claim 20, wherein the first secret data and the second secret data are encrypted based on a symmetrical encryption algorithm.

25. The system of claim 20, wherein the electronic circuit further includes a fourth set of electronic circuit elements electrically coupled to:
  receive configuration data that was encrypted externally to the electronic circuit according to a public key; and
  decrypt the configuration data based in part on parameters included in a private key that is associated with the public key, wherein the private key is included in the electronic circuit and not accessible, either directly via a connection or indirectly via side channels, to computing devices external to the electronic circuit.

26. The system of claim 25, wherein:
  the configuration data includes the data key encrypted with the public key; and
  the fourth set of electronic circuit element decrypts the data key and stores the data key in a data key register such that the data key is accessible by the first set of electronic circuit elements and the third set of electronic circuit elements.

27. The system of claim 25, wherein:
  the decryption of the first secret data is performed solely based on the coupling of the first set of electronic circuit elements and the parameters from the data key;
  the operations performed by the second set of electronic circuit elements are executed solely based on the coupling of the second set of circuit elements;
  the encryption of the second secret data is performed solely based on the coupling of the third set of electronic circuit elements and the parameters from the data key; and
  the decryption of the configuration data is performed based solely on the coupling of the fourth set of electronic circuit elements and the parameters from the private key.

28. The system of claim 20, wherein at least a part of the electronic circuit is included in one of a Field Programmable Gate Array (FPGA), a custom integrated circuit, an Application Specific Integrated Circuit (ASIC), a Programmable Logic Array (PLA) or electronic circuit elements integrated on a substrate.

29. The system of claim 20, wherein the one or more operations include mathematical operations.

30. The system of claim 20, wherein the one or more operations include a Boolean operation or computation of a predicate.

31. The system of claim 20, wherein, when one of the operations yields an indeterminate, undefined, or invalid result, the second secret data includes a secret error code.

32. The system of claim 20, wherein each of the first secret data and the second secret data is encrypted according to a high-entropy encryption algorithm, wherein each encryption of a same plaintext value yields a randomly selected different result that will decrypt back to the originally encrypted data.

33. The system of claim 20, further comprising a computing device including a processor and a memory, the memory including instructions executable by the processor such that the processor is programmed to:
  send the encrypted first secret data to the electronic circuit;
  send operation identifiers identifying the operations to be executed by the second set of electronic circuit elements to the electronic circuit; and
  receive the encrypted second secret data from the electronic circuit.

34. The system of claim 33, wherein the computing device is prevented from accessing in decrypted form the data key or any secret operands or secret computational results including (1) the first secret data, or (2) the second secret data.

35. The system of claim 33, wherein the computing device is further programmed to, via wireless communications:
  receive configuration data encrypted based on a public key from a second computing device;
  receive the first secret data encrypted based on the data key from the second computing device;
  receive the operation identifiers identifying the operations to be executed by the second set of electronic circuit elements from the second computing device; and
  transmit the encrypted second secret data to the second computing device.

36. The system of claim 35, wherein the computing device and the electronic circuit are included in a server programmed to provide cloud-computing services.

37. The system of claim 35, wherein the wireless communications include communications over the Internet.

38. A system comprising:
an electronic circuit including:
a first set of electronic circuit elements electrically coupled to:
receive first secret data that was encrypted externally to the electronic circuit according to a data key;
decrypt the first secret data based in part on parameters included in the data key;
a second set of electronic circuit elements electrically coupled to generate second secret data by executing one or more operations on the first secret data;
a third set of electronic circuit elements electrically coupled to encrypt the second secret data based in part on the parameters included in the data key, thereby providing encrypted second secret data for output; and
a computing device including a processor and a memory, the memory including instructions executable by the processor such that the processor is programmed to:
send the encrypted first secret data to the electronic circuit;
send operation identifiers identifying the operations to be executed by the second set of electronic circuit elements to the electronic circuit; and
receive the encrypted second secret data from the electronic circuit.

39. The system of claim 38, wherein the first set of electronic circuit elements, the second set of electronic circuit elements and the third set of electronic circuit elements are mutually exclusive to each other.

40. The system of claim 38, wherein the electronic circuit includes an interface that prevents access to unencrypted data including the data key, the first secret data, and the second secret data by computing devices external to the electronic circuit.

41. The system of claim 38, wherein the electronic circuit is organized as one or more synchronous state machines.

42. The system of claim 38, wherein the first secret data and the second secret data are encrypted based on a symmetrical encryption algorithm.

43. The system of claim 38, wherein the electronic circuit further includes a fourth set of electronic circuit elements electrically coupled to:
receive configuration data that was encrypted externally to the electronic circuit according to a public key; and
decrypt the configuration data based in part on parameters included in a private key that is associated with the public key, wherein the private key is included in the electronic circuit and not accessible, either directly via a connection or indirectly via side channels, to computing devices external to the electronic circuit.

44. The system of claim 43, wherein:
the configuration data includes the data key encrypted with the public key; and
the fourth set of electronic circuit element decrypts the data key and stores the data key in a data key register such that the data key is accessible by the first set of electronic circuit elements and the third set of electronic circuit elements.

45. The system of claim 43, wherein:
the decryption of the first secret data is performed solely based on the coupling of the first set of electronic circuit elements and the parameters from the data key;
the operations performed by the second set of electronic circuit elements are executed solely based on the coupling of the second set of circuit elements;
the encryption of the second secret data is performed solely based on the coupling of the third set of electronic circuit elements and the parameters from the data key; and
the decryption of the configuration data is performed based solely on the coupling of the fourth set of electronic circuit elements and the parameters from the private key.

46. The system of claim 38, wherein at least a part of the electronic circuit is included in one of a Field Programmable Gate Array (FPGA), a custom integrated circuit, an Application Specific Integrated Circuit (ASIC), a Programmable Logic Array (PLA) or electronic circuit elements integrated on a substrate.

47. The system of claim 38, wherein:
the electronic circuit is electrically coupled such that each operation performed by the electronic circuit on secret data has a latency that is independent of a value of the secret data.

48. The system of claim 47, wherein the one or more operations include mathematical operations.

49. The system of claim 47, wherein the one or more operations include a Boolean operation or computation of a predicate.

50. The system of claim 47, wherein, when one of the operations yields an indeterminate, undefined, or invalid result, the second secret data includes a secret error code.

51. The system of claim 47, wherein one of the operations is a conditional move, wherein the conditional move:
a. receives as operands an encrypted predicate as a first secret value, an encrypted true value, and an encrypted false value;
b. decrypts the predicate, the true value, and the false value;
c. sets a result equal to the true value if the predicate equals the true value;
d. sets the result equal to the false value if the predicate equals the false value;
e. encrypts the result; and
f. outputs the encrypted result as a second secret data value.

52. The system of claim 38, wherein each of the first secret data and the second secret data is encrypted according to a high-entropy encryption algorithm, wherein each encryption of a same plaintext value yields a randomly selected different result that will decrypt back to the originally encrypted data.

53. The system of claim 38, wherein the computing device is prevented from accessing in decrypted form the data key or any secret operands or secret computational results including (1) the first secret data, or (2) the second secret data.

54. The system of claim 38, wherein the computing device is further programmed to, via wireless communications:
receive configuration data encrypted based on a public key from a second computing device;
receive the first secret data encrypted based on the data key from the second computing device;
receive the operation identifiers identifying the operations to be executed by the second set of electronic circuit elements from the second computing device; and transmit the encrypted second secret data to the second computing device.

55. The system of claim 54, wherein the computing device and the electronic circuit are included in a server programmed to provide cloud-computing services.

56. The system of claim 54, wherein the wireless communications include communications over the Internet.

* * * * *